F. A. MONROE.
MACHINE FOR SAVING GOLD.
APPLICATION FILED OCT. 17, 1910.

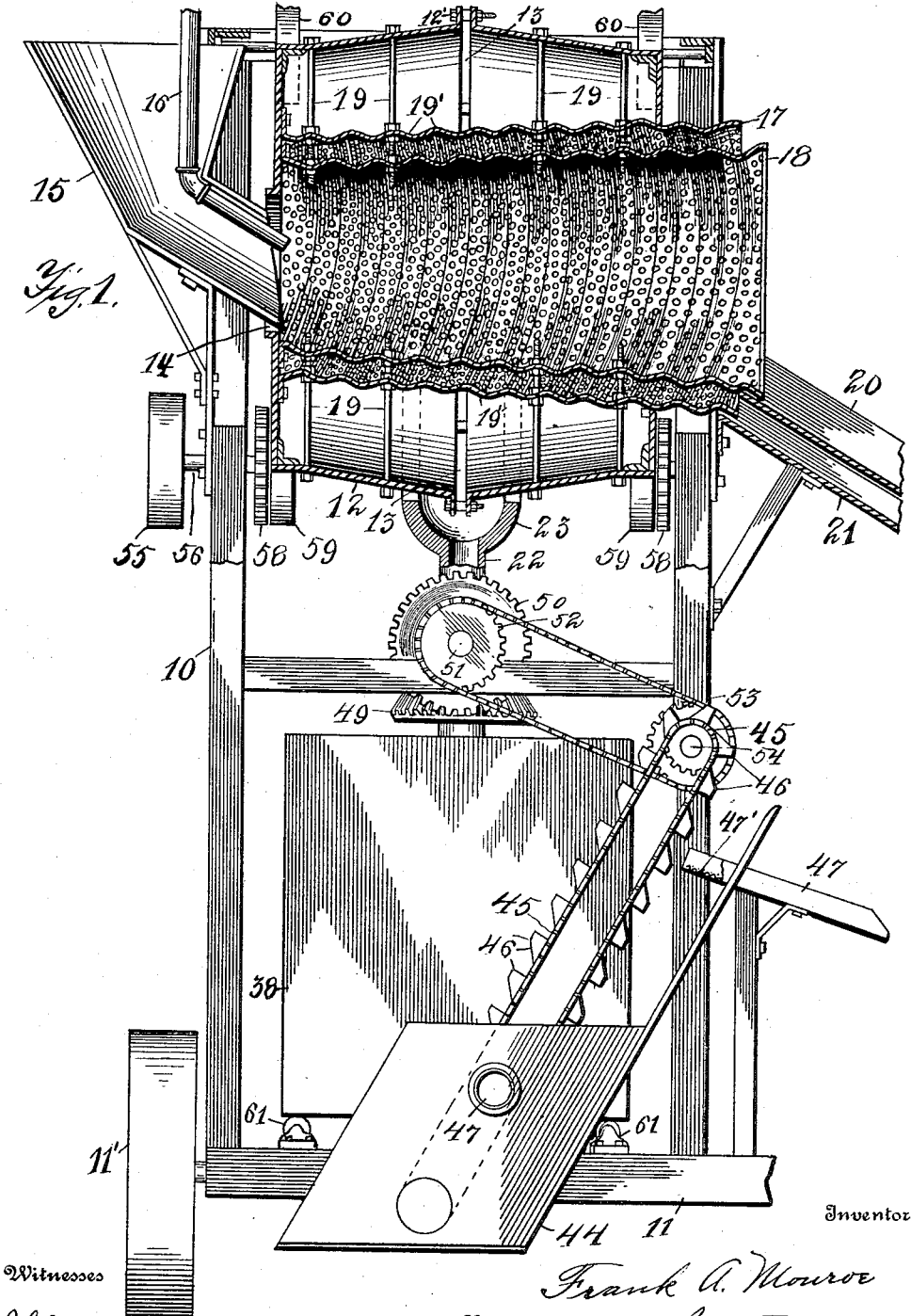

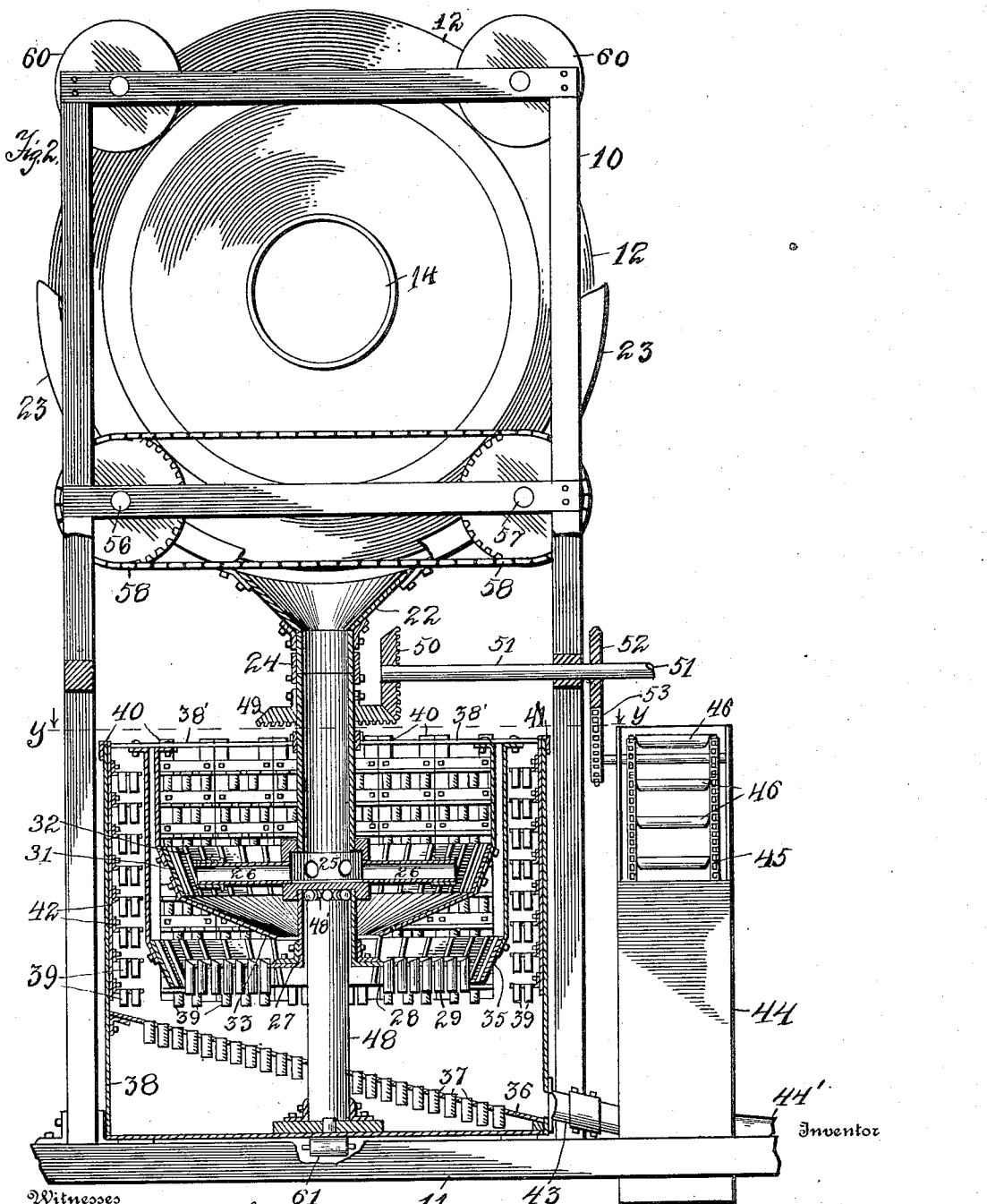

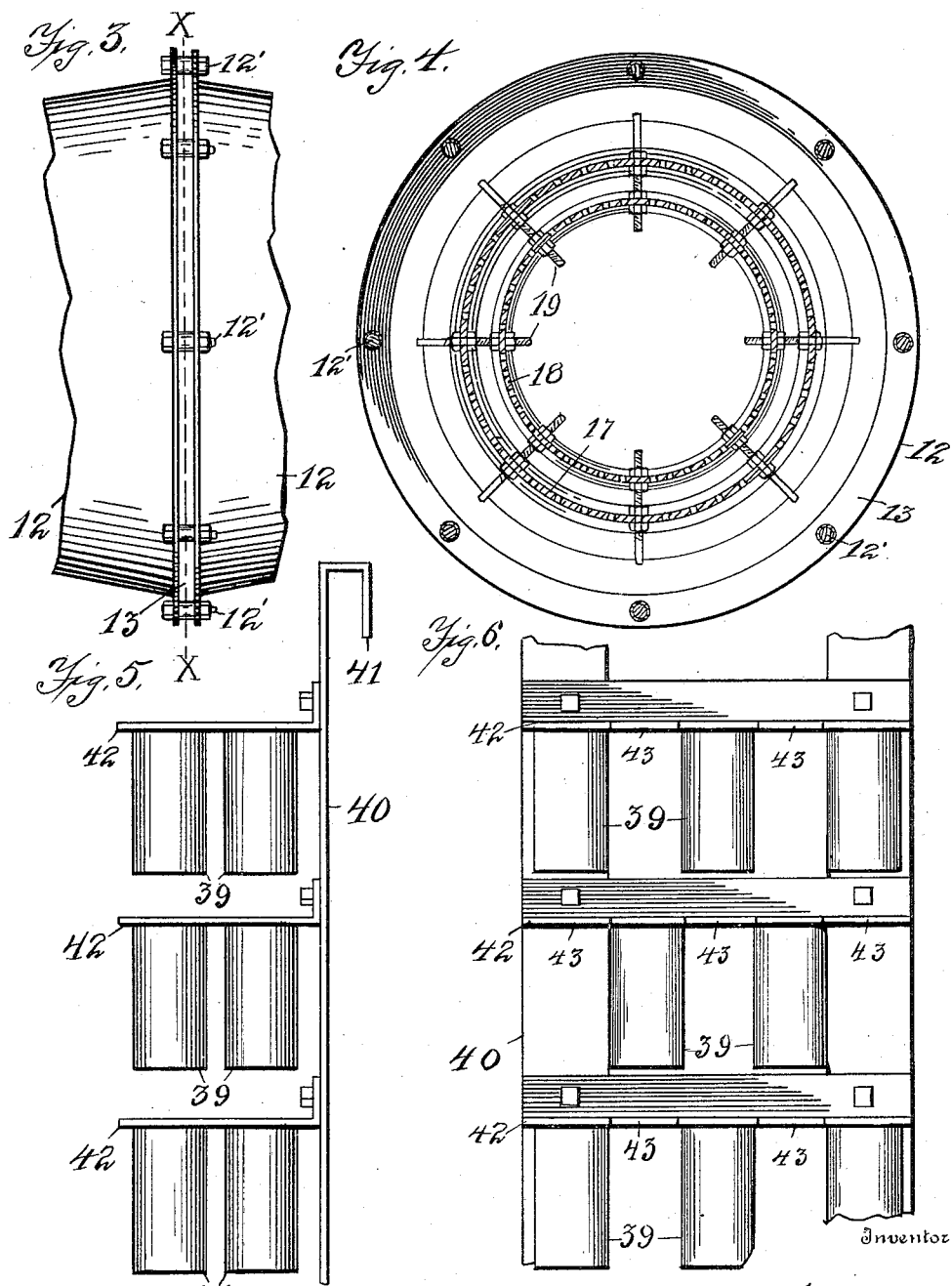

1,124,501.

Patented Jan. 12, 1915.
5 SHEETS—SHEET 4.

Witnesses
J. A. Ellsworth.
E. C. Hultgren.

Inventor
Frank A. Monroe
By S. Arthur Baldwin.
Attorney

F. A. MONROE.
MACHINE FOR SAVING GOLD.
APPLICATION FILED OCT. 17, 1910.

1,124,501.

Patented Jan. 12, 1915.
5 SHEETS—SHEET 5.

UNITED STATES PATENT OFFICE.

FRANK A. MONROE, OF JAMESTOWN, NEW YORK.

MACHINE FOR SAVING GOLD.

1,124,501.  Specification of Letters Patent.  Patented Jan. 12, 1915.

Application filed October 17, 1910. Serial No. 587,401.

*To all whom it may concern:*

Be it known that I, FRANK A. MONROE, a citizen of the United States, residing at Jamestown, in the county of Chautauqua and State of New York, have invented new and useful Improvements in Machines for Saving Gold, of which the following, taken in connection with the following drawings, is a full, clear, and exact description.

The invention relates to gold saving apparatus and the object of my improvement is to provide a mechanism wherein the gold bearing material will be thoroughly scoured and amalgamated with a minimum amount of loss, provision being made for screening the gold bearing material; and the invention consists in the construction and arrangement of the parts, as shown in this specification and the accompanying drawings, and pointed out in the claims.

Figure 7:
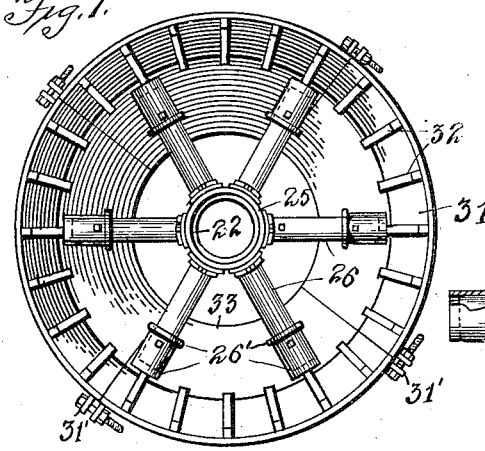
Figure 9:
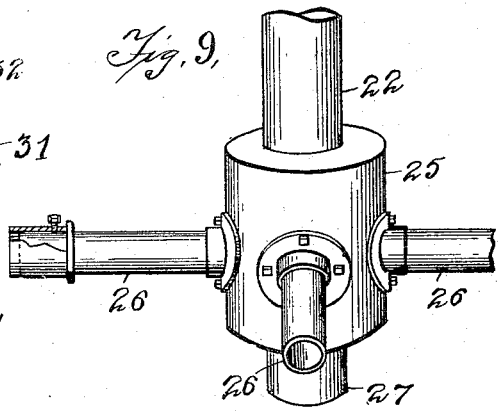
Figure 8:
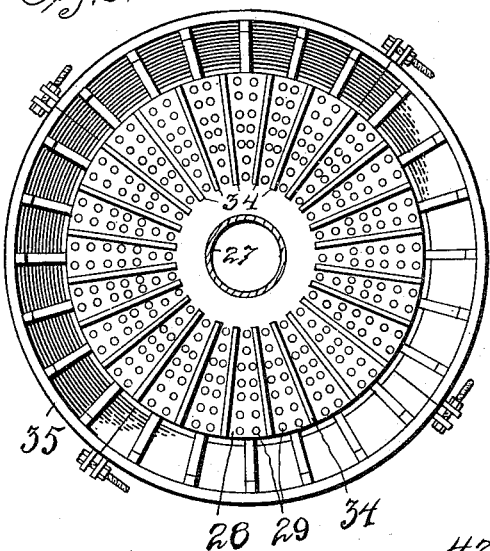
Figure 10:
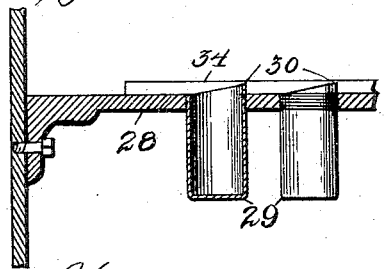
Figure 11:
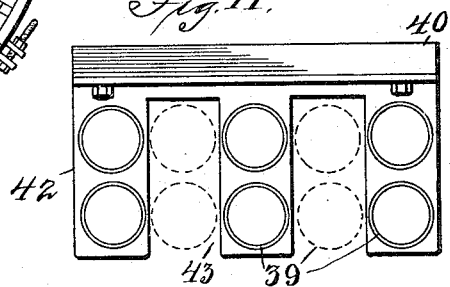
Figure 12:
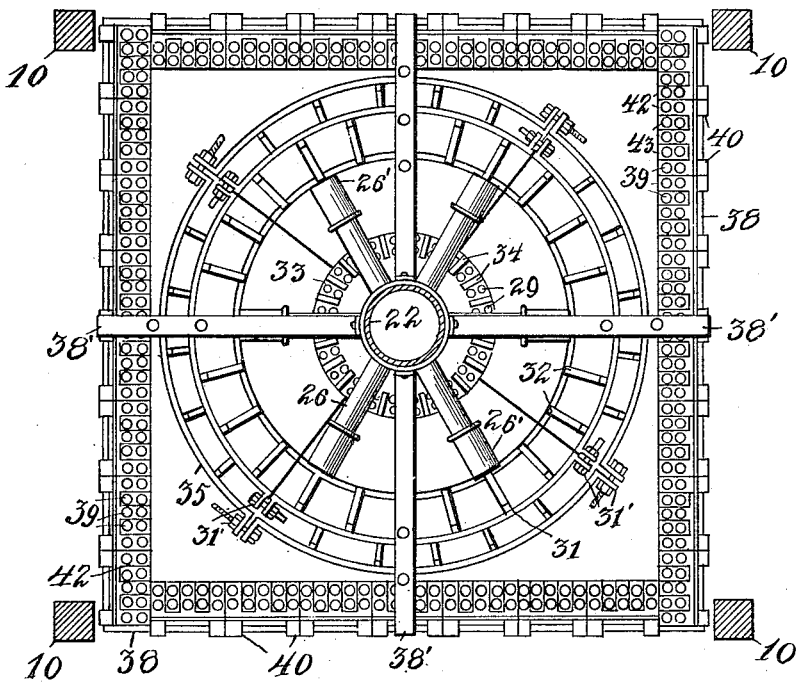
Figure 13:
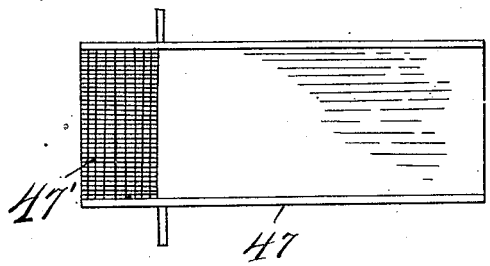

In the drawings, Figure 1 is an elevation of the amalgamator, the upper portion or mechanism for screening the gold bearing material being shown in section. Fig. 2 is an elevation of the amalgamator showing an end view of the screen mechanism and the lower portion of the mechanism shown in section. Fig. 3 is an elevation of the central portion of the casing for the screen showing the open space therein for the exit of the gold bearing material. Fig. 4 is a sectional view of the screen at line X X in Fig. 3. Fig. 5 is an end elevation of a portion of one of the racks for holding the mercury tubes; and Fig. 6 is a front elevation of the same. Fig. 7 is a plan view of the stand pipe with its tubular arms and the ribbed funnel-shaped pan surrounding the lower end of the stand pipe; and Fig. 8 is a plan view of a ribbed amalgamating pan placed beneath said funnel to receive therein the gold bearing material, the bottom of the pan supporting the amalgamating tubes. Fig. 9 is a perspective view of the lower end of the stand pipe showing the tubular arms extending out therefrom. Fig. 10 is a sectional view of a portion of the bottom of the amalgamating pan shown in Fig. 8, showing the arrangement of the mercury tubes. Fig. 11 is a plan view of the tube racks shown in Figs. 5 and 6. Fig. 12 is a sectional view at line Y Y in Fig. 2, showing a plan view of the amalgamating receptacle. Fig. 13 is a plan view of the discharge spout.

Similar numerals refer to corresponding parts in the several views.

The numeral 10 designates the supporting frame for the mechanism which frame is made sufficiently strong to support the heavy machinery and to stand the strain of the heavy work required in separating the gold from the gold bearing material. The frame 10 is preferably mounted on the bed 11 which bed may be supplied with wheels, as shown at 11', for moving the amalgamator and thereby keep it in close proximity to the gold bearing material. Suitable power is provided for operating the amalgamator.

The screen mechanism is mounted in the upper part of frame 10 and consists of a cylindrical drum or barrel 12. Barrel 12 is composed of two halves which are connected at the center by means of suitable bolts 12' and separating blocks, which arrangement provides an exit slot 13 therebetween entirely around the center of the barrel 12. Barrel 12 has an entrance opening 14 in one end for the gold bearing material, a suitable hopper 15 being supported on frame 10 and entering opening 14 in such a manner as to allow the barrel 12 to revolve around the stationary hopper 15. A water pipe 16 is inserted through opening 14 along with hopper 15 to provide plenty of water with the gold bearing material to thoroughly wash the same. Barrel 12 is provided with two concentrically arranged cylindrical screens 17 and 18, radial bolts 19 being provided to support the cylindrical screens in the barrel. Screens 17 and 18 have spiral corrugations running throughout their length so that they are self emptying, or automatically advance the gold bearing material through the hopper 15, when it is deposited in one end through opening 14. It is apparent that the gold bearing material will be received within the corrugations 19' of the inner screen 18 with plenty of water from pipe 16, and the finer particles will fall or be washed through the mesh of the screen 18 into the spiral corrugations 19 of the screen 17, and that the coarser elements will be advanced within the screens 18 and 17 to the troughs 20 and 21 at the opposite end of the screens. The finer particles of the gold bearing material will fall with the water through the outer screen 17 into the barrel 12. The halves of the barrel 12 incline toward the opening 13, causing the particles and water to seek the openings 13 and fall through the same into the stand pipe 22.

The upper end of stand pipe 22 is arranged with a semi-cylindrical trough 23 which extends up about halfway around the barrel 12 covering the open slots 13 so that fine particles of the gold bearing material which are left after passing through the screens 17 and 18 pass into the trough 23 and down the stand pipe 22, the mouth of the stand pipe being formed at a gradual incline from trough 23 as shown in Fig. 2.

The upper portion of the stand pipe is preferably connected with the lower portion by a joint 24 so that trough 23 may be stationary while the lower portion of the stand pipe turns in joint 24 and also so that should the upper portion with trough 23 become clogged it may easily be removed and cleaned. Stand pipe 22 extends down to an enlargement 25. Enlargement 25 is made so as to provide a chamber wherein the water and gold-bearing material fall and pass out through the tubular arms 26. Tubular arms 26 have the adjustable outer ends or nozzles 26' which are attached thereto by a set screw, as shown in Figs. 7 and 9. By means of nozzles 26' the distance between the end of the nozzle and the ribbed inner surface of the receptacle 31 is controlled, as also the size of the apertures in the end of the nozzle may be controlled.

Enlargement 25 of stand pipe 22 is mounted on its under side on a pedestal 48, the upper end being preferably arranged for a ball bearing 48' so that the stand pipe 22 will turn freely thereon. A disk shaped holder 28, which supports therein a large number of mercury tubes 29 is supported on the under side of part 25 by means of a tubular extension 27. The mercury tubes 29 for the holder 28 are preferably formed with lips 30 on their outer sides, so that as the stand pipe and part 28 are whirled with great rapidity the mercury and amalgamated gold contained therein will not be thrown out of the cups 29 by the centrifugal force.

A funnel-shaped receptacle 31 is supported from cross bars 48' around the ends of the tubular arms 26. The sides of the receptacle are inclined at an upward and outward angle so that as the water and gold-bearing material are thrown against the inclined surface they will be deflected against the inner side of the receptacles 38. The joints between the plates are made adjustable by screws and lugs 31' so that said upward and outward angle may be adjusted to suit the work. The inner surface of the receptacle 31 is provided with ribs 32 against which the water and gold bearing material are thrown by the whirling stand pipe, the action of the water and the sand scouring the gold containing particles against ribs 32.

That portion of the gold bearing material which is not deflected upwardly by the sides of the receptacle 31 drops down into the lower funnel-shaped portion 33 of the receptacle 31 and through an opening around the stand pipe 22 and flows out over the amalgamating plate 28. Plate 28 is attached to the stand pipe 22 and turns therewith. Radial ribs 34 are provided on plate 28 and rows of open-mouthed mercury tubes 29 are provided between said ribs on plate 28. Around the outer side of ribbed plate 28 a second pan-shaped ribbed rim 35 is supported from crossbars 38' at a spaced distance from the outer edge of plate 28 so that whatever of the gold bearing material passes over the mouths of the mercury tubes 29 will fall through this opening on to the inclined plate 36, which is also filled with mercury tubes 37. Mercury tubes 37 are preferably made with the square open mouth the lip not being necessary upon the tubes 37. Plate 36 is preferably arranged so that it is removably placed within the outer receptacle 38 which surrounds and incloses the stand pipe 22 and the scouring and almagamating mechanism thus far described. Receptacle 38 may be any suitable shape, but the square can is preferred.

The vertical inner surface of the receptacle 38 above plate 36 and around the receptacles 31 and 35 is covered with mercury tubes 39 which are attached thereto in the following manner: A sufficient number of racks 40 are provided to cover said inner surface of the receptacle 38 by hanging over the upper edge of the same, a suitable hook 41 being provided for engaging said upper edge. At spaced intervals on rack 40 shelves 42 are provided which have the tubes 39 attached thereto. Shelves 42 are provided with spaced openings 43 between the tubes 39 so that as the liquid gold bearing material is thrown out upon the inner surface of the receptacle 38 it will strike the mercury in the tubes 39, the gold amalgamating with said mercury and the material passing down. In order that there may be a continuous surface of mercury tubes or cups 39 the shelves 42 of the next lower row are so arranged that they break joints with the one above so that the mouth of the tubes in the next lower row will be opposite the openings 43 as shown in dotted line in Fig. 11. Each of the succeeding rows or shelves 42 is arranged in a similar manner breaking joints with the one above thereby so arranging the mercury tubes that it is almost impossible for a particle of gold to pass down through the series of shelves 42 around the inside of receptacle 38 without encountering the mouth of a mercury holding tube or cup. The refuse gold bearing material and water as it passes down on to plate 36 still contains a certain amount of the metal which is amalgamated in the cups 37 in plate 36. It then passes out through an exit tube 43 into a receptacle 44. Receptacle 44 has mounted therein on suitable journal shafts the elevating chain mechanism 45 with cups 46 which continually stir and raise the refuse material, throwing it upon the spout 47, the coarser material passing over the screen wire portion 47' and off the ends of the spout. The finer material, which with the water, contains whatever residue of gold or metal there may be still remaining in the material passes down through the screen 47' again into the box 44, and whatever residue of gold there may be in the water and finer particles settles to the bottom of the receptacle where there is a sufficient amount of mercury which has escaped from the mercury tubes to amalgamate whatever metal may remain, the water passing out of the exit spout 44'. Rolls 61 are provided beneath the receptacle 38 so that the entire receptacle may be easily moved out from the frame 10 and from beneath the screen mechanism, thereby greatly facilitating the process of cleaning up the amalgamating tube.

Power is applied to the mechanism for turning the stand pipe 22 through a suitable pulley on shaft 51. Shaft 51 bears sprocket wheel 52 which is connected by chain to wheel 53 on shaft 54, thereby turning shaft 54 for the upper end of elevating chain 45. The barrel 12 is rotated by power applied to pulley 55 which turns the shaft 56, thereby turning the shaft 57 by means of sprocket wheels and chains 58. Barrel 12 rests upon the smooth wheels 59 on shafts 56 and 57 and has the four guide wheels 60 on the upper side. It is apparent that the barrel 12 will be frictionally driven by the rotation of the wheels 59.

In operating the amalgamator the gold bearing material is thrown into the hopper 15 and extends into the revolving inner screen 18. The flow of water is introduced through pipe 16 into said inner screen along with the gold bearing material and aids in washing and scouring the sand and gold particles as they flow through the screens 18 and 17 into the revolving barrel 12 and out through slot 13 into the stand pipe 22. The gold bearing material passes down through the rapidly whirling stand pipe and is thrown out through the tubular arms 26 upon the ribbed surface of the receptacle 31. A portion of the water and gold bearing material is deflected upward on to the removable racks 40 to which are attached the mercury filled tubes 39. A portion of the water and gold bearing material passes down through the funnel 33 upon the rapidly whirling plate 28 and in turn is projected against the upwardly deflecting ribbed sides of the receptacle 35 which again forces a portion of the fluid and material against the rack covered inner side of receptacle 38. A portion of the gold which has not been amalgamated by the mercury filled tubes thus far, thus passes over the tubes 37 and plate 36. By this time the larger share of the gold has been extracted from the gold bearing material and it passes into the receptacle 44 where it is kept constantly stirred by the elevating mechanism 45 and passes out on spout 47 with the exception of a small residue as hereinbefore noted. As soon as the major portion of the mercury tubes have become amalgamated with a sufficient amount of gold or other metals, the receptacle 38 is removed from the frame 10 and the racks 40 and plates 28 and 36 bearing the mercury filled tubes are removed from the amalgamator and after emptying is recharged ready for repeating the amalgamating process.

I claim as new:

1. In a device of the character described, a stand pipe mechanism to receive the said gold-bearing material, a plurality of pipes extending from the lower end of the stand pipe, an inclined stationary ribbed surface before the mouths of said pipes to scour the gold-bearing material, and amalgamating mechanism outside of and around said ribbed surface to receive said material to amalgamate the metal therefrom.

2. In a device of the character described, a stand pipe to receive the gold-bearing material, a plurality of pipes extending from the lower end of said stand pipe, amalgamating mechanism outside of and around the ends of said pipes, and a stationary circular ribbed surface in front of the ends of said pipes placed at an upward angle between said pipes and amalgamating mechanism to deflect the water and the gold-bearing material over said amalgamating mechanism.

3. In a device of the character described, a stand pipe to receive the gold-bearing material, a plurality of pipes extending from said stand pipe, means for turning said stand pipe and the pipes leading therefrom, ribbed plates before the mouths of said pipes to deflect the gold-bearing material and water, a funnel-shaped apron leading from said ribbed plates to gather a portion of said material and water about the lower end of said stand pipe, and a shelf attached to the lower end of said stand pipe to turn therewith, and amalgamating means on said shelf.

4. In a device of the character described, a stand pipe to receive the gold-bearing material, a plurality of pipes extending from said stand pipe, means for turning said stand pipe and the pipes leading therefrom, ribbed plates before the mouths of said pipes to deflect the gold-bearing material and water, a funnel-shaped apron leading from said ribbed plates to gather said material and water about the lower end of said stand pipe, and a shelf attached to the lower end of said stand pipe to turn therewith, and mercury tubes on said shelf having upwardly extending lips on their outer sides.

5. In a device of the character described, a receptacle, a series of racks having suitable hanging means for supporting a plurality of said racks against the inner side of said receptacle, a plurality of shelves on said racks, mercury tubes in said shelves, and means for throwing the gold-bearing material over the mouths of said mercury tubes to amalgamate the gold.

6. In a device of the character described, a receptacle, a series of racks, hooks on the upper ends of said racks for hanging on the rim of said receptacle, a plurality of shelves on said racks, mercury tubes removably mounted in said shelves, said shelves having tube bearing portions and openings therein, and means for passing the gold-bearing material over the mouths of said tubes.

7. In a device of the character described, a frame, a stand pipe to receive the gold bearing material, having a plurality of mouths at its lower end, a circular series of ribbed plates supported before said mouths at an angle, means for changing the angle of said ribbed plates, amalgamating means around said ribbed plates to receive the gold-bearing material when deflected therefrom, substantially as and for the purpose specified.

8. In a device of the character described, a frame, a stand pipe having a plurality of mouths or spouts therefrom to receive the gold-bearing material, means for rapidly revolving said stand pipe, a pan-shaped receptacle supported before said mouths of said stand pipe having a ribbed inner surface, a funnel-shaped bottom on said pan-shaped receptacle, a second pan-shaped receptacle having a ribbed inner surface supported beneath said first pan-shaped receptacle, a ribbed shelf on the lower end of said stand pipe to revolve therewith, mercury tubes in said shelf between said ribs, a receptacle around said stand pipe and pan-shaped receptacles, a series of shelves around the inner sides of said receptacle having mercury tubes therein, an inclined removable plate in the bottom of said receptacle having mercury tubes therein, and a suitable exit at the lower edge of said inclined plate, substantially as and for the purpose specified.

In testimony whereof I have signed my name to this specification in the presence of two subscribing witnesses.

FRANK A. MONROE.

Witnesses:
A. W. KETTLE,
I. A. ELLSWORTH.

Copies of this patent may be obtained for five cents each, by addressing the "Commissioner of Patents, Washington, D. C."